United States Patent
Helbert et al.

(10) Patent No.: US 8,369,270 B2
(45) Date of Patent: Feb. 5, 2013

(54) METHOD AND A MOBILE PHONE TERMINAL ENABLING TO MERGE TELEPHONY SERVICES OVER HETEROGENEOUS NETWORKS

(75) Inventors: Emmanuel Helbert, Illkirch (FR); Vincent Bronner, Illkirch (FR)

(73) Assignee: Alcatel Lucent, Paris (FR)

( * ) Notice: Subject to any disclaimer, the term of this patent is extended or adjusted under 35 U.S.C. 154(b) by 362 days.

(21) Appl. No.: 12/712,318

(22) Filed: Feb. 25, 2010

(65) Prior Publication Data

US 2010/0220655 A1    Sep. 2, 2010

(30) Foreign Application Priority Data

Feb. 27, 2009   (EP) .................................... 09305182

(51) Int. Cl.
*H04W 4/00*    (2009.01)
(52) U.S. Cl. ........ 370/328; 370/352; 455/417; 455/445; 455/565
(58) Field of Classification Search .................. 370/328, 370/352; 455/417, 445, 565
See application file for complete search history.

(56) References Cited

U.S. PATENT DOCUMENTS

2005/0009525 A1*  1/2005  Evslin ........................... 455/445
2006/0153348 A1*  7/2006  Marappan ................... 379/88.19

FOREIGN PATENT DOCUMENTS

WO    WO 2006/137762 A1    12/2006

OTHER PUBLICATIONS

LM Ericsson: "IP Multimedia/Multiple Application/Telephony Usage Aspects," 3GPP Draft; SP-000641, $3^{rd}$ Generation Partnership Project (3GPP), Mobile Competence Centre; XP050193886, pp. 1-11, Dec. 11, 2000.
Digital Cellular Telecommunications System (Phase 2+); Universal Mobile Telecommunications System (UMTS); Combining Circuit Switched (CS) and IP Multimedia Subsystem (IMS) Services; Stage 2 (3GPP TS 23.279 version 7.7.0 Release 7); vol. 3-SA2, No. V7.7.0; XP014039890; pp. 1-37, Oct. 1, 2007.

* cited by examiner

*Primary Examiner* — Ricky Ngo
*Assistant Examiner* — Richard K Chang
(74) *Attorney, Agent, or Firm* — Fay Sharpe LLP

(57) ABSTRACT

A method to merge telephony services over a circuit switched network (3) and a packet switched data network (4), in a mobile phone terminal, comprises the steps of:
receiving communication events arriving via a circuit switched network (3),
receiving communication events arriving via a packet switched data network (4),
storing communication events into a shared memory,
and analyzing communication events arriving via the circuit switched network (3) and communication events arriving the via the packet switched data network (4), and then routing each communication event to a voice application, either directly or via said means for storing, in order to store it temporarily, so that all the events concerning a same call are synchronized when they are received by said voice application.

3 Claims, 5 Drawing Sheets

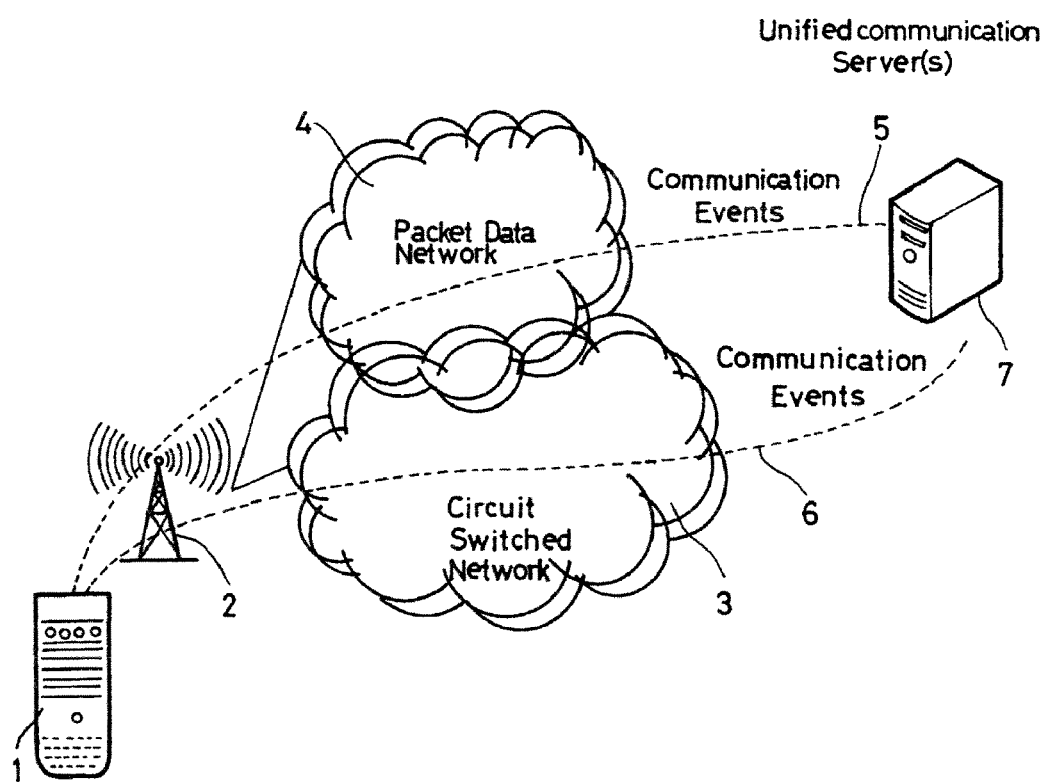

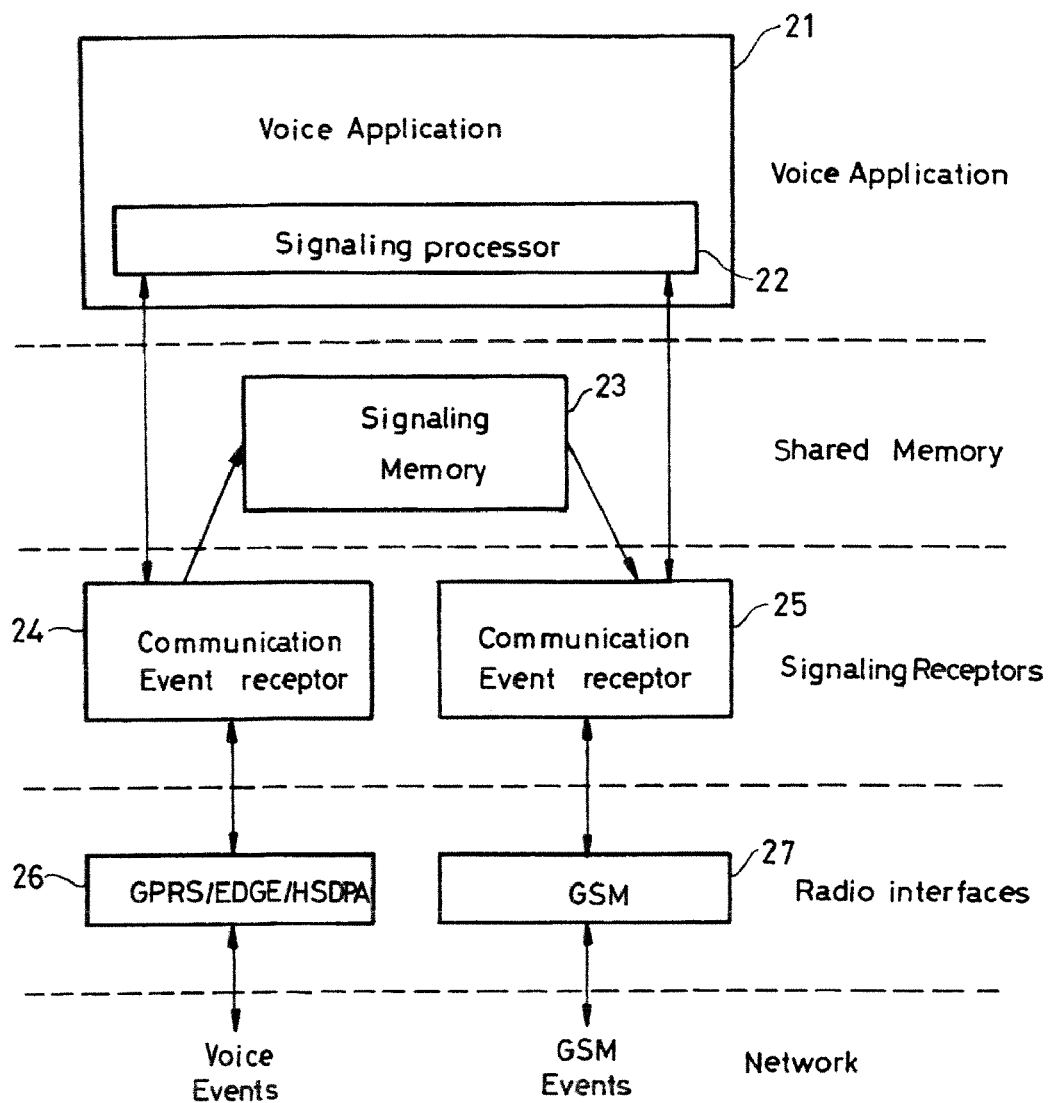

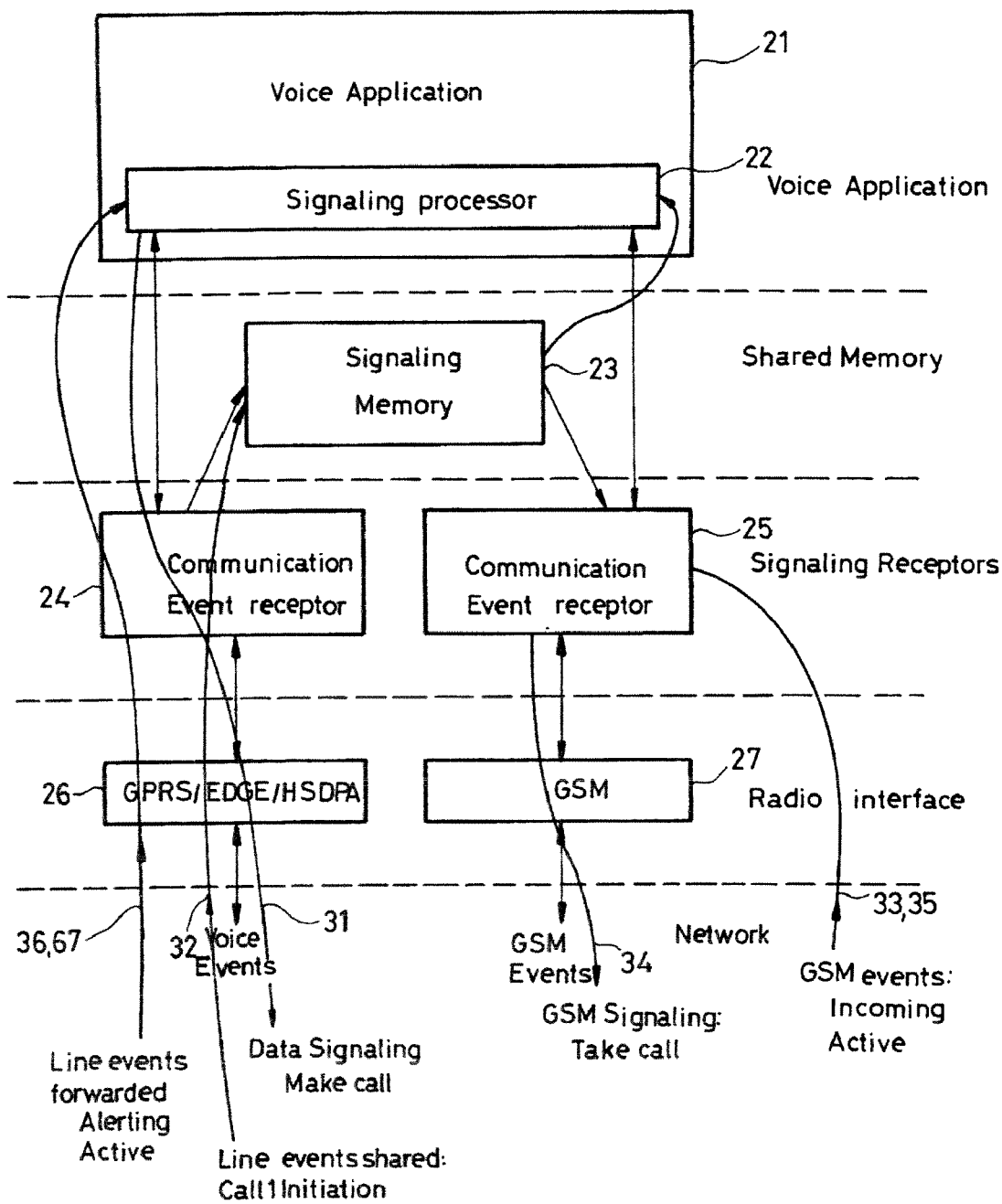
FIG_3

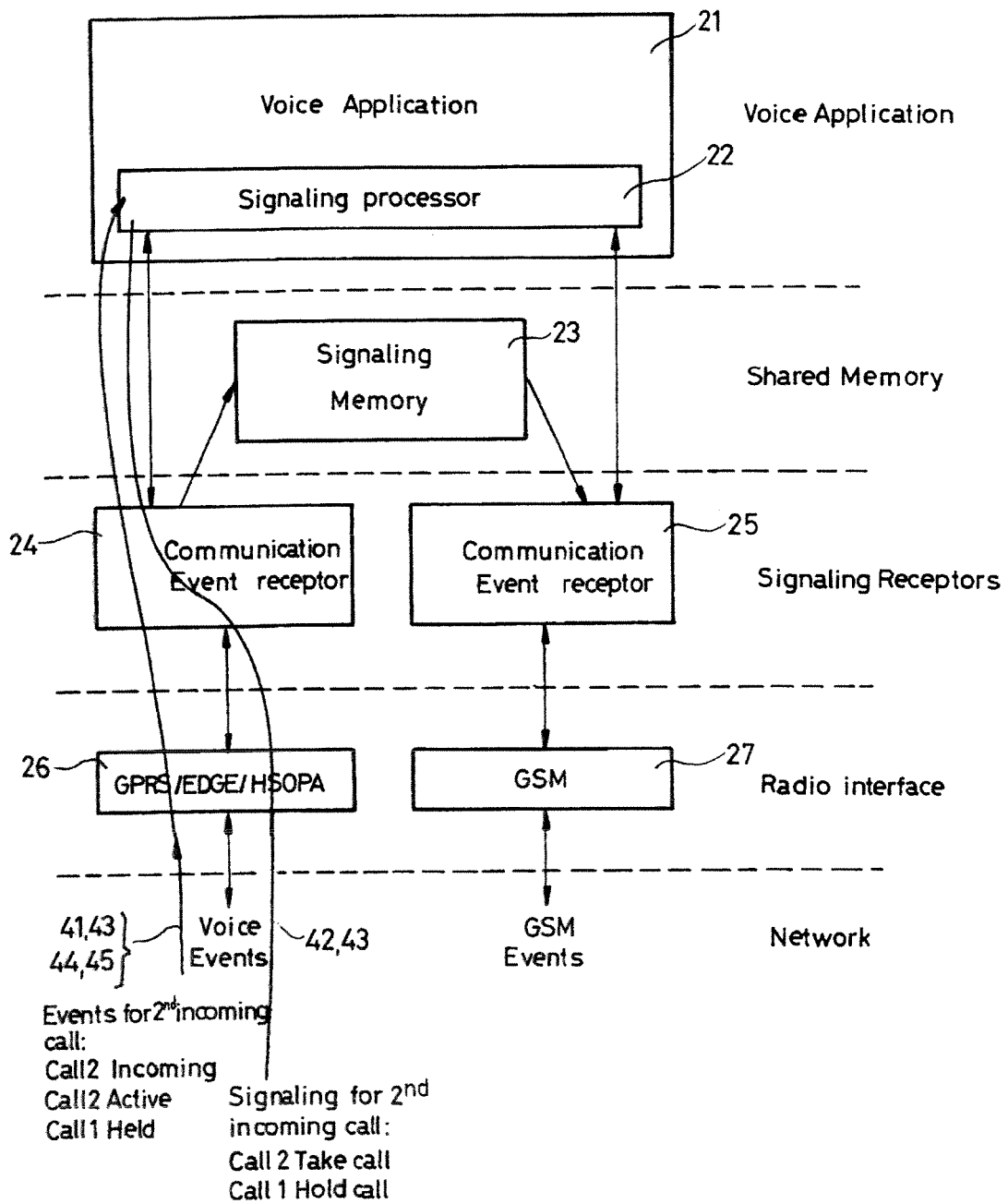

FIG_5
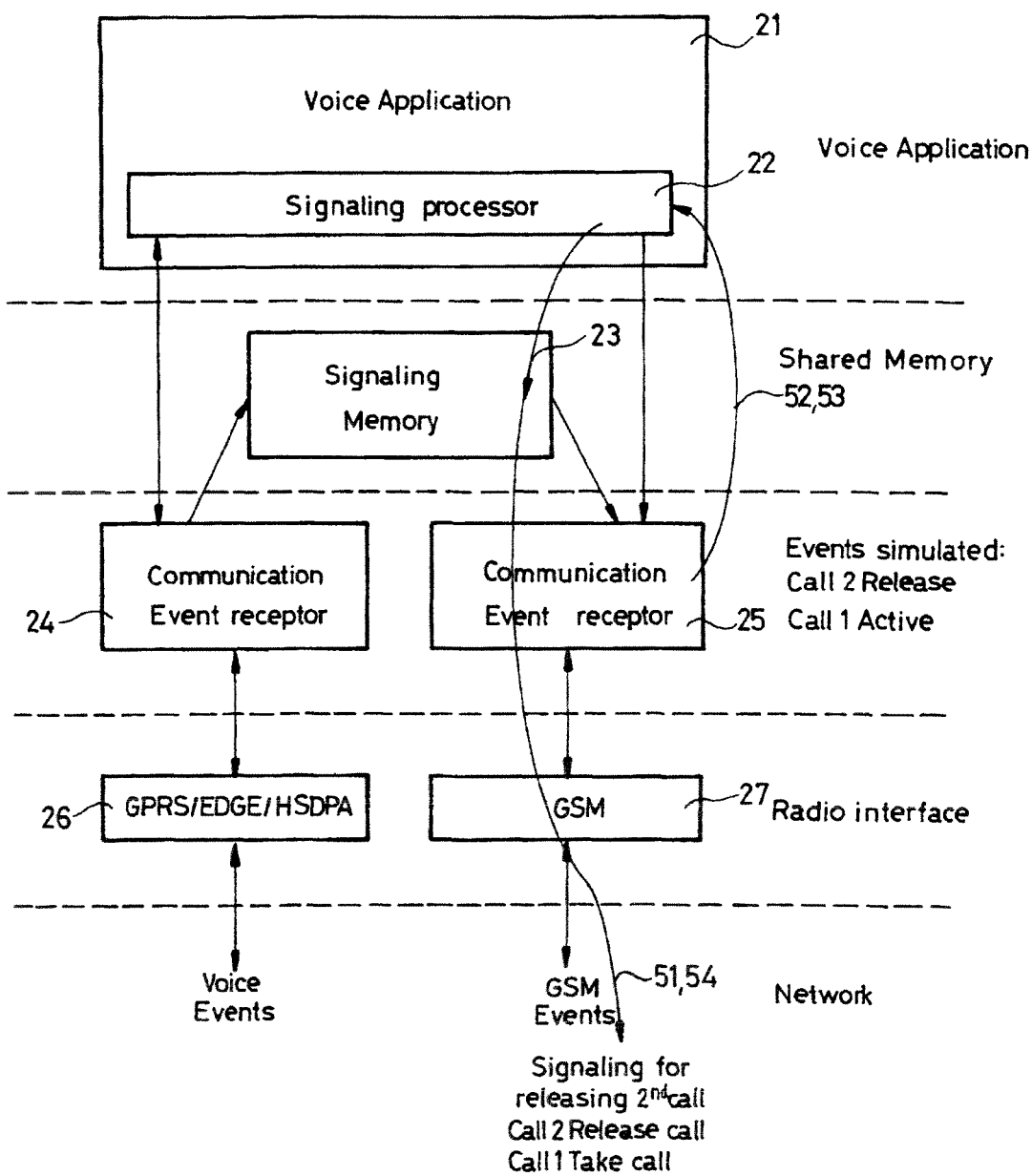

METHOD AND A MOBILE PHONE TERMINAL ENABLING TO MERGE TELEPHONY SERVICES OVER HETEROGENEOUS NETWORKS

BACKGROUND OF THE INVENTION

1. Field of the Invention

The present invention generally relates to a method and a mobile phone terminal enabling to merge telephony services over heterogeneous networks, i. e. a circuit switched network and a packet switched data network. It concerns all the mobile terminals that can be used for telephony, that is to say: phone handsets, smart phones, and personal computers comprising a telephony interface.

2. Description of the Prior Art

In an enterprise, a unified communication server provides sophisticated voice services to employees of this enterprise, such as unified directories research, communication logs, instant messaging, telephonic and instant messaging presence, and voice services such as call hold, back and forth, conference, call forward, access to central directory, dial by name, call log, voice mail, . . . . These services are fully available for fixed telephone terminals, but are only partially available for mobile phone terminals when these mobile terminals are outside the premises of the enterprise.

In particular, a unified communication server offers some basic services to the classical GSM handsets, such as conference, call forwarding, business voice mail consulting, dual call, business forwarding activation and deactivation, etc. These basic services are activated through DTMF codes sent over the GSM circuit switched network. DTMF codes respectively represent the actions of a user on the twelve dial keys of a phone. These codes can transmit twelve symbols only, and they cannot be used for backwards transmission of data, from the server to the terminals, because the mobile phone terminals generally do not comprise DTMF decoders.

It is desirable to extend these services, by adding more sophisticated services such as: business directory consulting, business call log consulting, dial by name, instant messaging, telephony presence, etc, that a unified communication classically offers to fixed terminals. These sophisticated services cannot be activated through Dual Tone Multi Frequency (DTMF) codes sent over the GSM circuit switched, because they need more signaling data and a bidirectional transmission. They are implemented by a signaling data transmission via a mobile packet switched data network, such as a 3G network (GPRS, UMTS, HSDPA, . . . ) or high data rate wireless local area network (WiFi, WiMAX, . . . ), or a newer packet switched network.

Current voice application solutions for mobile handsets are deployed either in a public land mobile circuit switched network (with basic services only) or in a public land packet switched data network (with sophisticated services in addition to the basic services), but never in both type of networks at the same time. That is to say that signaling is either carried over a circuit switched network (GSM for instance) or over a packet switched data network (GPRS, UMTS, HSDPA, . . . ) but is never carried on both networks.

It is desirable to alternately use both types of networks to offer, to the end users, sophisticated telephony services whenever it is possible, and to offer only basic services, as a backup solution, when it is not possible to offer the sophisticated services (No network coverage).

A service could generate signaling data on a circuit switched network and on a packet data network, at the same time. However, in such a case, both signaling types should be handled, though they are sent asynchronously. For instance, when setting up a call, the voice application should wait for the circuit switched call signaling, to consider that a voice link is really active. On the other hand, packet data network signaling may be lost, depending on the network coverage. So it would be necessary to synchronize signaling data coming from both types of networks when a service is activated, and to provide a backup mode when only one or several circuit switched networks are available.

Thus, there is a need to provide a technical solution to synchronize signaling data coming from both types of networks when a service is activated. The 3GPP community has developed a solution supported by the Internet Multimedia Subsystem (IMS). However this solution has two drawbacks: The IMS is not widely deployed today, and it will not be deployed in the enterprises because it would be too expensive.

The document WO 2006/137762 describes a terminal in a mobile communication system arranged for transmitting a first and a second media stream (respectively for video and voice) to a receiving terminal, the first and the second media stream being transmitted separate from each other, but at least partly simultaneously. The first media stream is associated with a first end-to-end time delay and the second media stream is associated with a second end-to-end time delay. The first end-to-end time delay is larger than the second end-to-end time delay.

The terminal further comprises:
control means arranged for presenting the first media stream at the terminal delayed from the transmission of the first media stream with a time dependent on the time difference between the first and the second end-to-end time delay;
and means for estimating end-to-end time delays arranged for estimating the first end-to-end time delay and the second end-to-end time delay.
The first end-to-end time delay is estimated by:
recording a first time when a data packet to which a reply is requested is transmitted to the receiving terminal;
recording a second time when the reply is received from the receiving terminal;
subtracting the first time from the second time;
optionally, subtracting, from the result of the subtraction, a possible waiting time that the receiving terminal has waited from receiving the transmitted data packet until the reply was sent to the terminal;
dividing the result of the subtracting calculation by two, and;
adding, to the result of the division calculation, a current buffer delay in the receiving terminal, which buffer delay is measured at the receiving terminal and transmitted to the sending terminal.

This known solution is not adapted for synchronizing first and second data indicating events concerning a same call, because:

These events do not generate a continuous flow of data, as voice and video do, because they are scarce. So it is not possible to estimate a time shift once for all. Restituting accurately the time intervals between the events is not important for events concerning a call. Most important is correctly restituting the order of the perception of events, because it is essential for establishing or releasing a call, and all other call services.

The aim of the present invention is to solve this synchronization problem by simple means.

SUMMARY OF THE INVENTION

A first object of the invention is a method to merge telephony services over a circuit switched network and a packet switched data network comprising the steps of:

receiving communication events arriving via a circuit switched network, receiving communication events arriving via a packet switched data network, storing communication events into a shared memory, synchronizing all the events concerning a same call, before sending them to a voice application, so that all the events concerning a same call are synchronized when they are received by said voice application;

characterized in that synchronizing comprises the steps of:

analyzing communication events arriving via the circuit switched network and communication events arriving the via the packet switched data network, and then routing each communication event to a voice application, either directly to said voice application, or via said means for storing, in order to store it temporarily, so that all the events concerning a same call are synchronized when they are received by said voice application, by taking into account the type of each event, and the current status of the communication for deciding to directly forward an event or to store it temporarily, until another event is received.

A second object of the invention is a mobile phone terminal enabling to merge telephony services over a circuit switched network and a packet switched data network, comprising:

means for receiving communication events arriving via a circuit switched network, means for receiving communication events arriving via a packet switched data network, means for storing communication events into a shared memory, and means for synchronizing all the events concerning a same call, before sending them to a voice application, so that all the events concerning a same call are synchronized when they are received by said voice application;

characterized in that said means for synchronizing all the events concerning a same call comprise means for analyzing communication events arriving via the circuit switched network and communication events arriving the via the packet switched data network, and then routing each communication event to said voice application, either directly to said voice application, or via said means for storing, by taking into account the type of each event, and the current status of the communication for deciding to directly forward an event or to store it temporarily, until another event is received.

This terminal can generate and handle signaling data on a circuit switched network and on a packet switched data network, at the same time, because the means for storing communication events into a shared memory enable to handle separately both kinds of signaling data and then to synchronize them.

With such a phone terminal, a packet switched data network and a circuit switched network are used only for supporting the signaling data transmission because the terminal is based on the client-server model. So a classical packet data switched network and a classical circuit switched network can be used without modification. In addition, the communication server does not need any modification.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which:

FIG. 1 represents an embodiment of the phone terminal according to the invention, while it is transmitting and receiving signaling data on a circuit switched network and on a packet switched data network, at the same time.

FIG. 2 functionally represents one embodiment of the phone terminal according to the invention.

FIG. 3 shows a signaling flow for an example in which a mobile phone terminal according to the invention establishes a phone call.

FIG. 4 shows a signaling flow for an example in which this mobile phone terminal receives a second phone call during this first call.

FIG. 5 shows a signaling flow for an example in which this mobile phone terminal switches back from the second phone call to the first call, and wherein the coverage by a packet switched data network has disappeared.

DETAILED DESCRIPTION OF THE PREFERRED EMBODIMENTS

FIG. 1 represents an embodiment 1 of the phone terminal according to the invention, while it is transmitting and receiving signaling data on a circuit switched network 3 and on a packet switched data network 4, at the same time. This terminal is connected to a base station 2 that belongs to the circuit switched network 3 and to the packet switched data network 4. In an alternative of this embodiment, the connection to the packet switched data network and circuit switched network can be realized through two separate base stations. This terminal 1 is exchanging, with an enterprise unified communication server 7, communication events 6 on the circuit switched network 3 for basic services and other communication events 5 on the packet switched data network 4 for sophisticated services, at the same time.

The server 7 is a classical unified communication server.

FIG. 2 functionally represents one embodiment of the phone terminal according to the invention. It comprises: a software module 21 for a voice application, including a signal processor 22; a software module 23 for storing, into a shared first-in-first-out memory, communication events arriving via the circuit switched network 3 and communication events arriving via the packet switched data network 4, in order to synchronize these events; a software module 25 for receiving communication events arriving via the circuit switched network 3 and a software module 24 for receiving communication events arriving via the packet switched data network 4; a software module 26 constituting a radio interface for a packet switched network (GPRS, or EDGE, or HSDPA, for instance) network, and a software module 27 constituting a radio interface for a circuit switched network (GSM for instance).

On one hand, sophisticated voice services such as conference, back and forth, transfer, etc, are triggered through web services transmitted over the packet switched data network 4. All communication events related to the communication state are also transmitted towards the mobile terminal over the packet switched data network 4. On the other hand, the voice channel is established over the circuit switched network 3, using GSM signaling for instance.

The purpose of the signaling memory 23 is to synchronize these two signaling streams. This is especially needed to handle voice communication set up: The communication events transmitted over the packet switched data network 4 reach the terminal before the GSM signaling indicating an incoming call. Thus, it is necessary to postpone the first communication event waiting for the GSM signaling arrival which represents the effective voice call set-up. In the meantime, the communication event arrived over the packet switched data network 4 may bring added value to the voice application by giving information such as the caller name, the caller phone number, the caller instant messaging status . . . .

This synchronization is achieved thanks to the memory 23 shared between the two communication event receptors 24 and 25. If a first communication event previously received via the packet switched data network 4 must be processed only after reception of a second event received via the GSM circuit switched network, this first event, when received, is written into the memory 23. When the GSM signaling reaches the terminal, the corresponding event receptor 25 checks whether a corresponding event already exists in the memory 23. It finds the first event in the memory 23, and then transmits it to the signaling processor 22 of the voice application 21.

Communication events receptors 24-25 are in charge of analyzing the events coming respectively from the packet switched data network 4 and the circuit switched network 5. The events received by the event receivers 24 and 25 may be directly forwarded to the signaling processor 22, or may be temporarily stored in the memory 23 so that they are shared with the other event receptor. The event receptors 24 and 25 check the content of the memory 23 and analyze the events that are stored in this memory 23. They take into account the type of each event, and the current status of the communication for deciding to directly forward an event or to store it temporarily, until another event is received.

Generally, communication events arrive more rapidly via the packet switched data network rather than via the circuit switched network. But the opposite case can occur, and then the shared memory 23 is used by the event receptors 24 and 25 in the same way for synchronizing the events.

For instance, the reception of a GSM communication event may trigger the forwarding, to the signaling processor 22, of a communication event previously received via the packet switched data network 4 and that has been stored in the signaling memory 23.

In other circumstances, a communication event stored in the memory 23 may prevent the communication event receptor 25 to forward a received GSM event to the signaling processor 22.

The following part describes three scenarios when a mobile phone terminal according to the invention establishes a phone call, manages a second incoming call, and then ends the first call without packet switched data network availability.

FIG. 3 shows a signaling flow for an example in which a mobile phone terminal according to the invention establishes a phone call:

The voice application 21 detects that a packet switched data network is available.

The signaling processor 22 of the voice application 21 sends a web request towards the unified communication server 7 to establish a voice call (step 31).

The server 7 calls back the terminal 1 through the circuit switched network 3 and, in the meantime, sends an application event through the packet switched data network 4 to indicate that an outgoing call is initiated (step 32). The communication event receptor 24 writes this event into the shared memory 23.

The communication event receptor 25 receives, from the circuit switched network 3, an incoming GSM communication event indicating that an incoming call has arrived (step 33).

The communication event receptor 25 analyzes the received event and detects that the incoming GSM communication event corresponds in reality to an outgoing call. The call is answered silently (i.e. without letting the user know that the call is established) (step 34).

The circuit switched network 3 sends a GSM communication event indicating that the voice call has been established. The communication event receptor 25 does not forward this event to the voice application to prevent a false early voice call setup before the remote peer has taken the call (step 35).

In the meantime, the server 7 sends a communication event (Alerting), via the packet switched data network 4, indicating that the voice call is trying to be established with the remote peer. This communication event is forwarded to the signaling processor 22 which indicates, to the user of the terminal, that the callee terminal is ringing (step 36).

When the remote peer takes the call, the server 7 sends a communication event indicating that a voice call is active, i. e. established (step 37). This event is forwarded to the signaling processor 22 in the voice application 21, which indicates to the user that the call is established.

Then the voice application 21 handles the established call

FIG. 4 shows a signaling flow for an example in which this mobile phone terminal receives a second phone call during this first call. To simplify the example, let us assume that a GSM call is already established and that no other GSM event associated to this new call can be received:

The server 7 tries to establish a second voice call (Step 41). All communication events received by the communication event receptor 24 are forwarded to the signaling processor 22.

On user's request, the voice application 21 takes the second call and puts the first call on hold by using web service signaling sent through the packet switched data network 4, up to the server 7 (Step 42).

The server 7 puts the first call on hold and activates the voice flow of the second call (Step 43).

The server 7 sends a communication event indicating that a second voice call is active, i. e. established (step 44). This event is forwarded to the signaling processor 22 in the voice application 21, which indicates to the user that the call is established.

The server 7 sends a communication event indicating that the first voice call is held (step 45). This event is forwarded to the signaling processor 22 in the voice application 21, which indicates to the user that the first call is now on hold.

In the final state, the voice application 22 handles two voice calls, one of them being held.

FIG. 5 shows a signaling flow for an example in which this mobile phone terminal switches back from the second phone call to the first call, and wherein the coverage by the packet switched data network has disappeared. So the signaling will be carried by the circuit switched network 3 exclusively:

The voice application 21 detects that the packet switched data network 4 is not available anymore.

On user's request, the voice application 22 sends DTMF codes via the circuit switched network 3 to release the active call, i. e. the second call (Step 51). These DTMF codes are received and interpreted by the server 7. It releases the second call.

The communication event receptor 25 simulates an event corresponding to a release of the second call and sends it to the signaling processor 22 (Step 52).

The communication event receptor 25 simulates an event corresponding to an activation of the first call, and sends it to the signaling processor 22 (Step 53).

The voice application 21 sends DTMF codes to the server 7 via the circuit switched network 3 to re-activate the first call (Step 54). These DTMF codes are received and interpreted by the server 7. It re-activates the first call. This last step 54 is optional. In other embodiments, the server directly interprets the release of the active call as an activation of the call that has been put on hold at step 51. In this case there is no step 54.

There is claimed:

1. A mobile phone terminal enabling to merge telephony services over a circuit switched network and a packet switched data network, comprising:
    a first radio interface operative to receive communication events arriving via a circuit switched network,
    a second radio interface operative to receive communication events arriving via a packet switched data network,
    a shared memory that stores communication events, and
    at least one processor configured to synchronize all the events concerning a same call, before sending them to a voice application, so that all the events concerning the same call are synchronized when they are received by the voice application;
    wherein the at least one processor is configured to analyze communication events arriving via the circuit switched network and communication events arriving the via the packet switched data network, and to route each communication event to the voice application, either directly to the voice application, or via the shared memory, by taking into account the type of each event, and the current status of the communication for deciding to directly forward an event or to store it temporarily, until another event is received.

2. A method to merge telephony services over a circuit switched network and a packet switched data network comprising the steps of:
    receiving communication events arriving via a circuit switched network,
    receiving communication events arriving via a packet switched data network,
    storing communication events into a shared memory,
    synchronizing all the events concerning a same call, before sending them to a voice application, so that all the events concerning a same call are synchronized when they are received by the voice application, wherein synchronizing comprises:
        analyzing communication events arriving via the circuit switched network and communication events arriving the via the packet switched data network, and
        routing each communication event to the voice application, either directly to the voice application, or via the shared memory, in order to store it temporarily, so that all the events concerning a same call are synchronized when they are received by the voice application, by taking into account the type of each event, and the current status of the communication for deciding to directly forward an event or to store it temporarily, until another event is received.

3. A non-transitory computer readable medium storing a set of machine executable program instructions, which, when executed on a computer, cause the computer to perform the following method:
    receiving communication events arriving via a circuit switched network,
    receiving communication events arriving via a packet switched data network,
    storing communication events into a shared memory,
    synchronizing all the events concerning a same call, before sending them to a voice application, so that all the events concerning a same call are synchronized when they are received by the voice application, wherein synchronizing comprises:
        analyzing communication events arriving via the circuit switched network and communication events arriving the via the packet switched data network, and
        routing each communication event to the voice application, either directly to the voice application, or via the shared memory, in order to store it temporarily, so that all the events concerning a same call are synchronized when they are received by the voice application, by taking into account the type of each event, and the current status of the communication for deciding to directly forward an event or to store it temporarily, until another event is received.

* * * * *